United States Patent [19]

Okitaka et al.

[11] Patent Number: 5,206,834
[45] Date of Patent: Apr. 27, 1993

[54] SEMICONDUCTOR MEMORY DEVICE PERFORMING LAST IN-FIRST OUT OPERATION AND THE METHOD FOR CONTROLLING THE SAME

[75] Inventors: Takenori Okitaka; Yasunori Maeda, both of Hyogo, Japan

[73] Assignee: Mitsubishi Denki Kabushiki Kaisha, Tokyo, Japan

[21] Appl. No.: 850,203

[22] Filed: Mar. 12, 1992

Related U.S. Application Data

[63] Continuation of Ser. No. 545,796, Jun. 29, 1990, abandoned.

[30] Foreign Application Priority Data

Oct. 14, 1989 [JP] Japan .................................. 1-267140

[51] Int. Cl.$^5$ ................................................ G11C 8/04
[52] U.S. Cl. ................................ 365/259; 365/189.02; 365/219; 365/221; 365/230.03; 365/236; 307/246
[58] Field of Search .............. 365/221, 219, 189.02, 365/236, 149, 239, 230.03; 307/246

[56] References Cited

U.S. PATENT DOCUMENTS

| | | | |
|---|---|---|---|
| 4,751,675 | 6/1988 | Knaver | 365/221 |
| 4,823,302 | 4/1989 | Christopher | 365/221 |
| 4,888,741 | 12/1989 | Malinowski | 365/221 |
| 4,935,896 | 6/1990 | Matsumura et al. | 365/149 |
| 4,959,813 | 9/1990 | Todoroki | 365/221 |
| 5,027,326 | 6/1991 | Jones | 365/221 |

FOREIGN PATENT DOCUMENTS 60-262242 12/1985 Japan .
62-175499 11/1987 Japan .
63-153787 6/1988 Japan .

*Primary Examiner*—Joseph E. Clawson, Jr.
*Attorney, Agent, or Firm*—Lowe, Price, LeBlanc & Becker

[57] ABSTRACT

A LIFO device includes a plurality of memory circuits (1), a write address pointer (2) and a read-out address pointer (3). The write address pointer (2) selects the memory circuit (1) in which data are to be written, while the read-out address pointer (3) selects the memory circuit (1) from which data are to be read out. Each of the write address pointer (2) and the read-out address pointer (3) alternately and repeatedly performs the count-up operation for selecting the memory circuits in a predetermined sequence and the count-down operation of selecting the memory circuits in a sequence which is the reverse of the predetermined sequence. Control is also so made that the selection by the read-out address pointer (3) precedes the selection by the write address pointer (2).

15 Claims, 9 Drawing Sheets

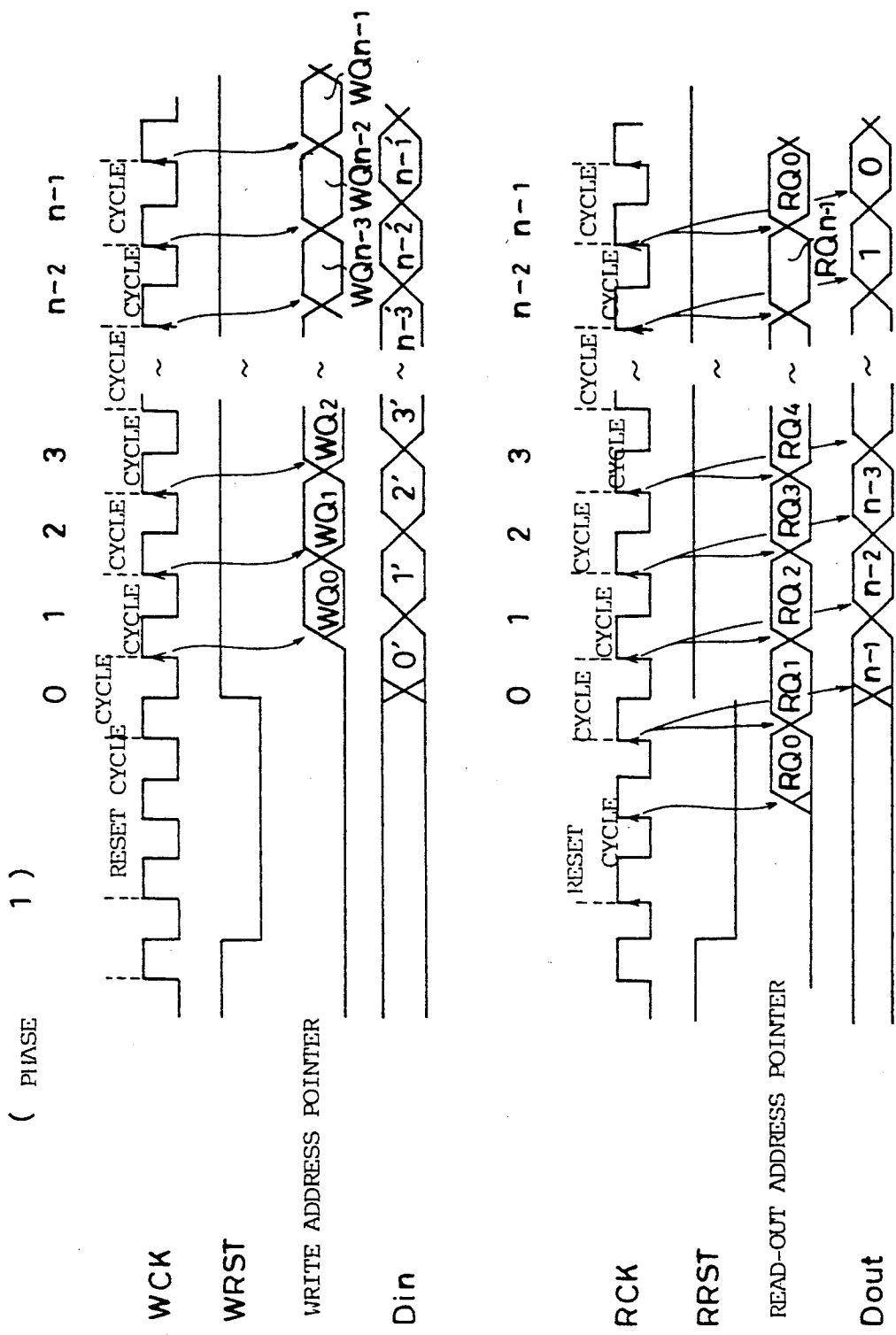

FIG.6B
(PHASE 2)
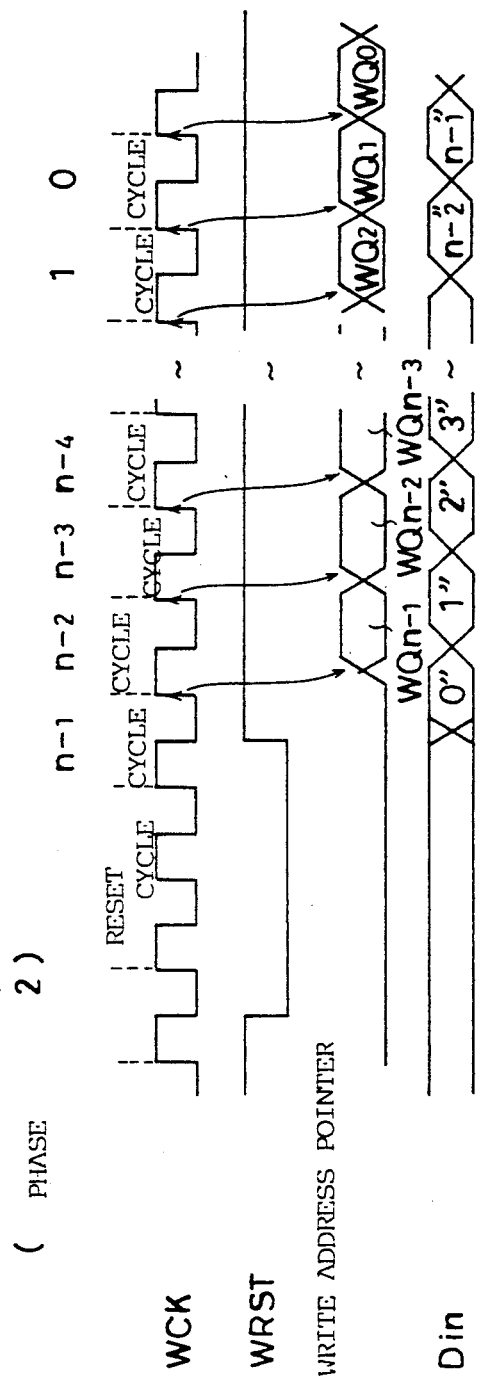
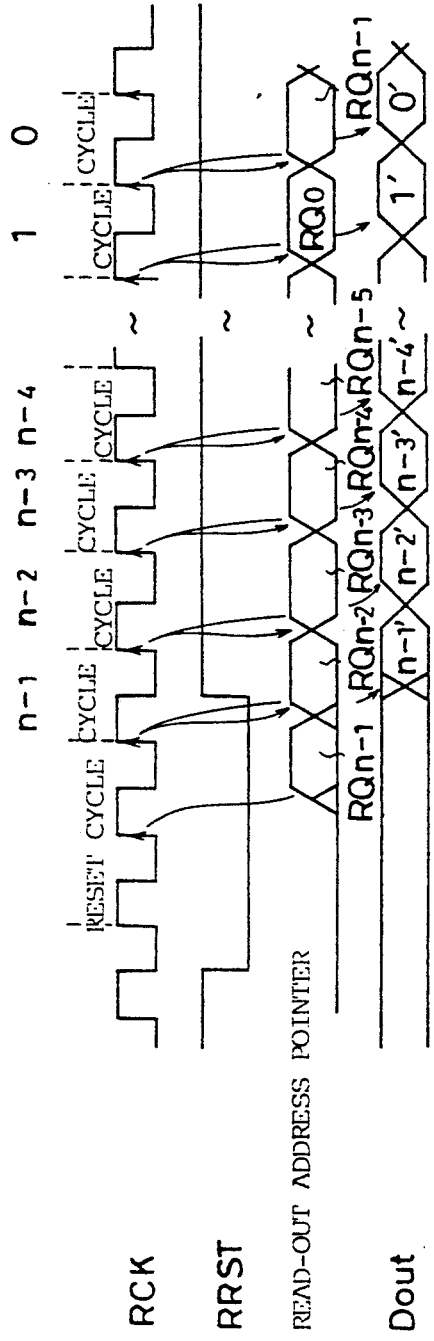

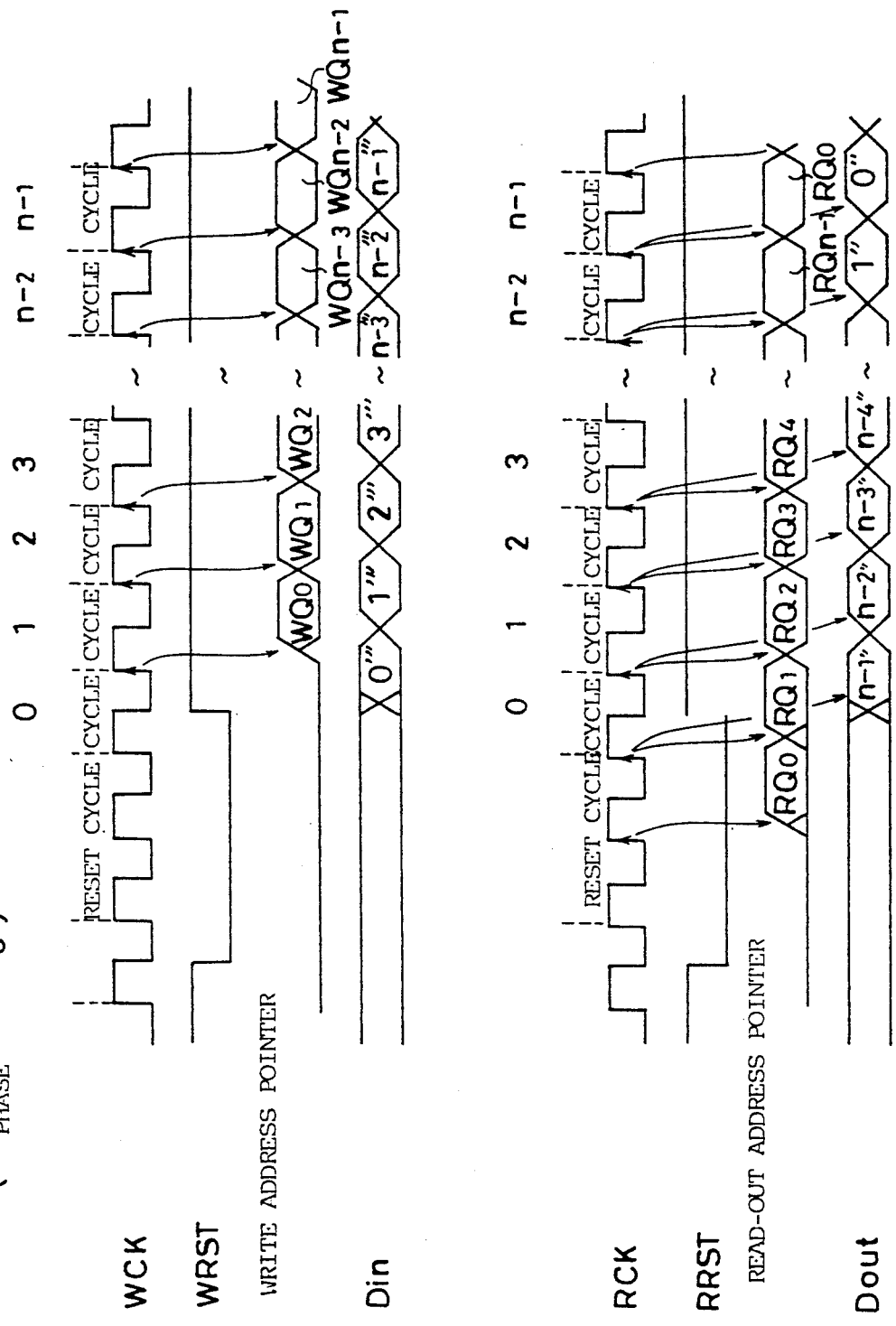
FIG.6C (PHASE 3)

SEMICONDUCTOR MEMORY DEVICE PERFORMING LAST IN-FIRST OUT OPERATION AND THE METHOD FOR CONTROLLING THE SAME

This application is a continuation of application Ser. No. 07/545,796 filed June 29, 1990 now abandoned.

BACKGROUND OF THE INVENTION

1. Field of the Invention

This invention relates to a semiconductor memory device and a method for controlling the same. More particularly, it relates to a Last In - First Out device or LIFO device in which last written data is read out first, and the method for controlling the same.

2. Description of the Background Art

A LIFO device is used for example in a duplicator for duplicating on the reverse side of the paper in case double-side duplication and for making duplication in such a manner that the left and right sides of the original is reversed. FIG. 7 is a block diagram showing the structure of the conventional LIFO device disclosed in the Japanese Utility Model Laying-Open No. 62-175499.

This LIFO device includes a first memory 11, a second memory 12, a write address counter 13, a read-out address counter 14 and multiplexers 15, 16. The outputs of the write address counter 13 and the read-out address counter 14 are multiplexed by the multiplexers 15, 16 so as to be applied to the memories 11, 12 as the write address or the read out address. When the write address is applied to the memory 11, the read-out address is applied to the memory 12 and, when the read-out address is applied to the memory 11, the write address is applied to the memory 12.

The write address counter 13 is set by a write reset signal WRST to a specified address, such as address 0. A count up operation is then performed in synchronism with a write clock signal WCK. The read-out address counter 14 is set by a read-out reset signal RRST to a specified address, such as an address n-1, and a count-down operation is then performed in synchronism with a read-out clock signal RCK.

FIG. 8 shows the write address movement and the read-out address movement in the LIFO device of FIG. 7.

In a phase 1, the memory 11 performs a writing operation, while the memory 12 performs a read-out operation. The write address counter 13 performs a count-up operation so that the write address is incremented sequentially from address 0 to address n-1. On the other hand, the read-out address counter 14 performs a count-down operation, so that the read-out address is sequentially decremented from address n-1 to address 0. The data read out in phase 1 from the memory 12 are the data written before phase 1.

In phase 2, the memory 11 performs a read-out operation, while the memory 12 performs the write operation. In this case, the write address counter 13 similarly performs a count-up operation so that the write address is sequentially incremented from address 0 to address n-1. The read-out address counter 14 performs a count-down operation so that the read-out address is sequentially decremented from address n-1 to address 0. The data read out in phase 2 from the memory 11 are the data written in phase 1 and are read out in the reverse order to that used in writing.

In phase 3, the memory 11 performs a write operation, while the memory 12 performs a read-out operation. In this case, the write address counter 13 performs a count-up operation, while the read-out address counter 14 performs a count-down operation. The data read out from the memory 12 in phase 3 are the data written in phase 2, and are read out in the reverse order to that used in writing.

Similar operation is repeated following phase 3 to realize a LIFO operation capable of performing continuous data read-out and writing.

In the above described conventional LIFO Device, not only the two memories 11, 12 but a logic IC having the functions of the multiplexers 15, 16 and address counter 13, 14 are required, resulting in an increased number of component parts and an inconveniently large substrate area.

On the other hand, there is disclosed in the Japanese Patent Laying-Open Nos. 60-262242 and 63-153787 are First In - First Out circuit or FIFO circuit provided with a memory circuit, a write pointer and a read-out pointer. In this FIFO circuit, control is so made that writing always precedes read-out to realize the First In - First Out operation. Hence, it may be contemplated to implement the LIFO operation with the use of this FIFO circuit. However, when the control is so made in this FIFO circuit that simply the read-out always precedes writing, it is not possible to implement the LIFO operation capable of continuous read-out and writing.

SUMMARY OF THE INVENTION

It is an object of the present invention to provide a LIFO system semiconductor memory device at lower costs and with lower space requirement than the prior art.

It is another object of the present invention to provide a LIFO device capable of continuously writing and reading out of data with a lesser number of components parts.

It is still another object of the present invention to provide a control method for implementing a LIFO operation capable of continuously writing and reading out data with a lesser number of component parts.

The semiconductor memory device according to the present invention comprises a plurality of memory devices for respectively storing data, a first selection device for sequentially selecting the memory devices and writing data applied from outside to the selected memory device, a second selection device for sequentially selecting the memory devices and reading out data stored in the selected memory device.

Each of the first and second selection devices is adapted for repeatedly and alternately performing a first mode of selecting the memory device in a predetermined sequence and a second mode of selecting the memory devices in a sequence which is a reverse of the predetermined sequence. The operation is controlled so that the selection by the second selection device always precedes the selection by the first selection device.

In another aspect of the present invention, in a method for controlling a semiconductor memory device comprising a plurality of memory devices, a first selection device and a second selection device, control is made in the following manner.

That is, each of the first and second selection devices is controlled so that a first mode of selecting a plurality of memory devices in a predetermined sequence, and a second mode of selecting the memory devices in a sequence which is the reverse of the above mentioned sequence, are repeated alternately. Control is also so made that selection by the second selection means precedes the selection by the first selection means.

During the first mode, each of the first and second selection devices selects a plurality of the memory devices in a predetermined sequence, with the selection by the second selection device preceding the selection by the first selection device. In this manner, data applied from outside are written continuously in a plurality of the memory devices in a predetermined sequence, while data stored in the memory devices are read out in the same predetermined sequence.

During the second mode, each of the first and second selection devices selects the plurality of the memory devices in a sequence which is the reverse of the sequence in the first mode, while the selection by the second selection device precedes the selection by the first selection device. In this manner, data applied from outside are written continuously in the plurality of the memory devices in a sequence which is the reverse of that for writing, while the data written in the first mode in the plurality of memory devices are read out in the same reverse sequence.

The above first and second modes are repeated alternately in the similar manner.

In this manner, the data written during the preceding mode are sequentially read out during each mode in the sequence which is the reverse of the sequence in which they are written, while new data are written sequentially and continuously. As a result, a LIFO operation in which the data written last are read out first is realized.

According to the present invention, control is made in this manner so that a first mode of selecting a plurality of the memory devices in a predetermined sequence and a second mode of selecting these memory devices in a sequence which is the reverse of the above predetermined sequence, are repeated, and that the selection for read-out by the second selection device precedes the selection for writing by the first selection device. In this manner, a LIFO system semiconductor memory device may be realized, which is capable of continuously writing and reading out data with a lesser number of component parts, for realizing lower costs and space saving in the LIFO system semiconductor memory device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 6A, 6B and 6C are timing charts for illustrating the operation of the LIFO device of FIG. 1, FIG. 6A showing the operation for phase 1, FIG. 6B the operation for phase 2 and FIG. 6C the operation for phase 3.

DESCRIPTION OF THE PREFERRED EMBODIMENTS

By referring to the accompanying drawings, a preferred embodiment of the present invention will be explained in detail.

Figure 1:
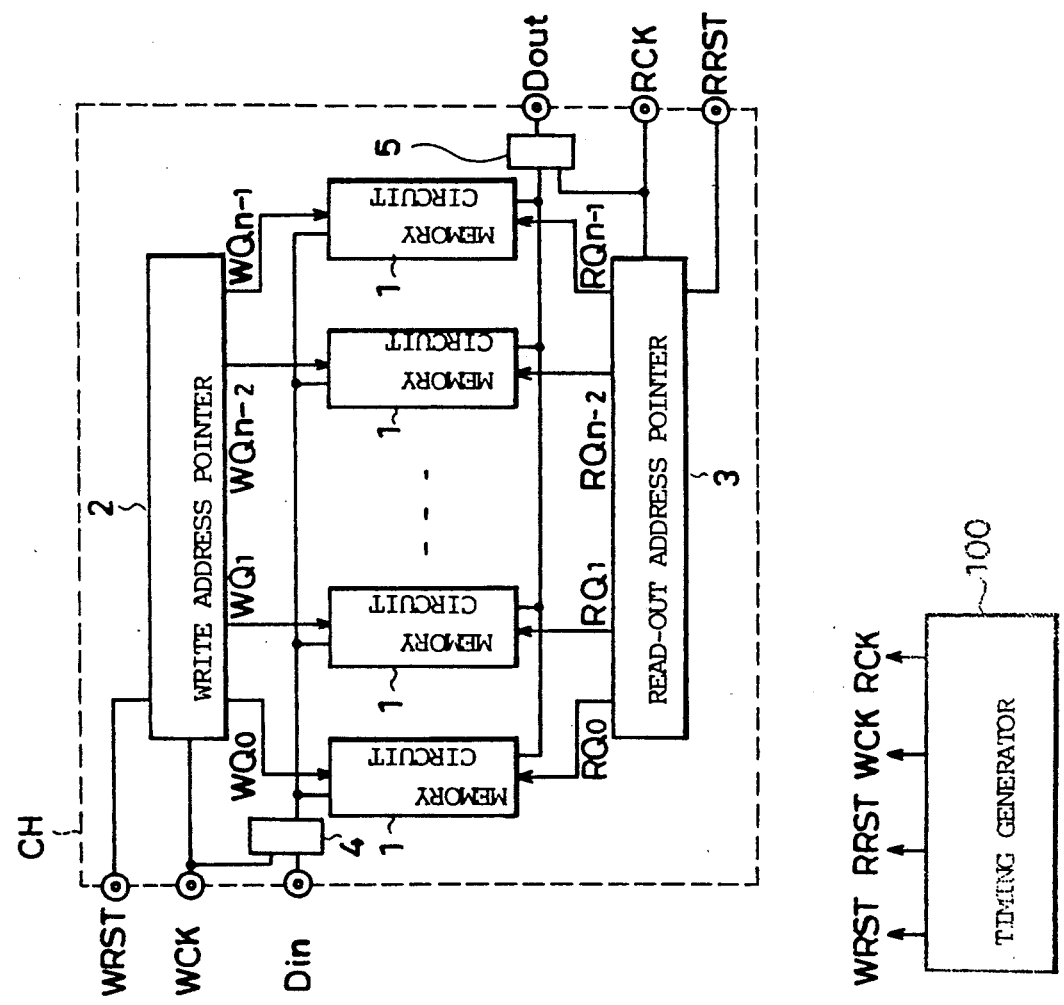
FIG. 1 is a block diagram showing the structure of a LIFO device according to an embodiment of the present invention.

FIG. 1 is a block diagram showing the structure of a LIFO device according to an embodiment of the present invention.

Referring to FIG. 1, a plurality of memory circuits 1, a write address pointer 2, a read-out address pointer 3, a write data latch circuit 4 and a read-out data latch circuit 5 are provided on a semiconductor chip CH. A write reset signal WRST, a write clock signal WCK, a read-out reset signal RRST and a read-out clock signal RCK are applied from outside to this LIFO device. These signals are applied from, for example, a timing generator 100.

Responsive to the write clock signal WCK, data Din applied to a data input terminal are fetched in a write data latch circuit 4 so as to be written in the memory circuit selected by the write address pointer 2. On the other hand, data are read out to the read-out data latch circuit 5 from the memory circuit 1 selected by the read-out address pointer 3 and, responsive to the read-out clock signal RCK, are outputted to the outside as the output data Dout. It is to be noted that the 0 th memory circuit 1 to the (n-1) th memory circuit 1 are designated the addresses 0 through $(n-1)$, respectively.

When reset by the write reset signal WRST, the write address pointer 2 is set to a specified address, such as an address 0 or address (n-1). This activates a write address signal $WQ_0$ or $WQ_{n-1}$ outputted from the write address pointer 2. The write address pointer 2 counts up or down in synchronism with the write clock signal WCK. This sequentially activates write address signals $WQ_0$ to $WQ_{n-1}$. Resetting by the write reset signal WRST causes the operation to be switched each time between count-up and count-down-operations alternately.

When reset by the read-out reset signal RRST, the read-out address pointer 3 is set to a specified address, such as an address 0 or an address (n-1). This activates the read-out signals $RQ_0$ or $RQ_{n-1}$ outputted from the read-out address pointer 3. The read-out address pointer 3 counts up or down in synchronism with the read-out clock signal RCK. This sequentially activates the read-out address signals $RQ_0$ to $RQ_{n-1}$. Resetting by the read-out reset signal RCK causes the operation to be switched each time between the count-up and count-down operations alternately.

Figure 2:
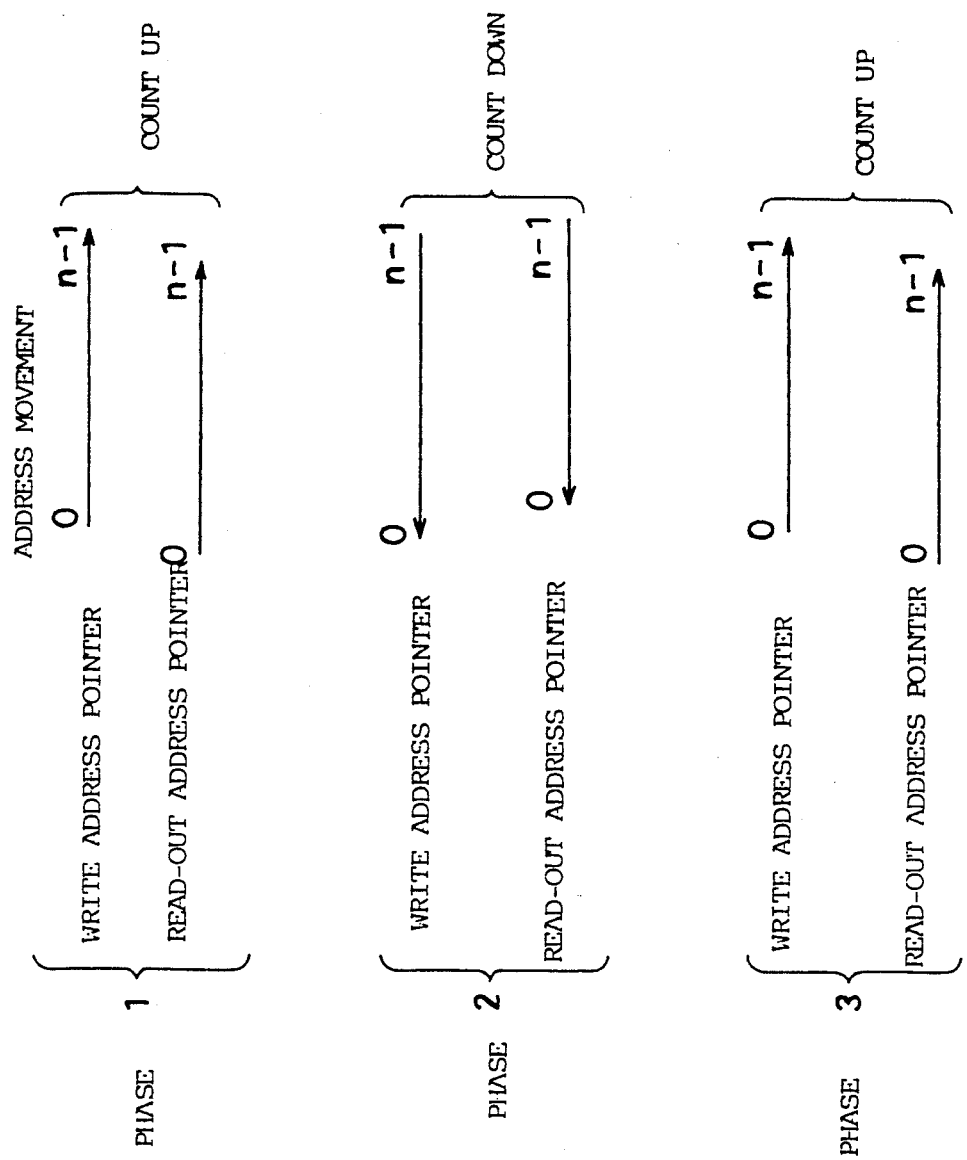
FIG. 2 shows address movement in the LIFO device of FIG. 1.

FIG. 2 shows the write address and read-out address movements in the LIFO device of FIG. 1.

In phase 1, the write address pointer and the read-out address pointer count up from address 0 to address (n-1). In this case, control is performed such that the read-out address designated by the read-out address pointer precedes the write address designated by the write address pointer, with the write address not outrunning or going ahead of the read-out address.

In phase 2, the write address pointer and the read-out address pointer count down from address (n-1) to address 0. In this case, control is performed such that the read-out address similarly precedes the write address, with the write address not outrunning or going ahead of the read-out address. In phase 2, data written in phase 1 are read out in the sequence which is the reverse of the sequence for writing.

In phase 3, the write address pointer and the read-out address pointer count up from address 0 to address (n-1), as in phase 1. In this case, control is performed such that the read-out address precedes the write address, with the write address not outrunning the read-out address. In phase 3, the data written in phase 2 are read out in a sequence which is the reverse of the sequence for writing.

By the above described address movements, a LIFO operation capable of continuously writing and reading out data may be implemented by a sole LIFO device.

Figure 3:
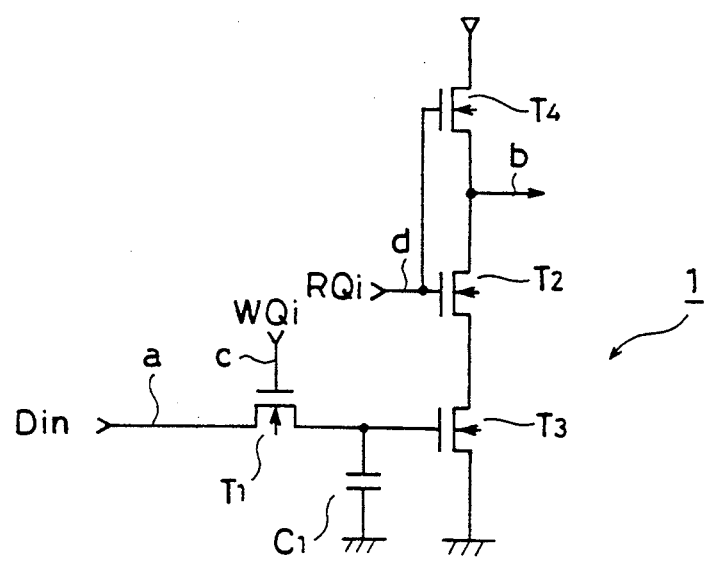
FIG. 3 is a circuit diagram showing the structure of a memory circuit included in the LIFO device of FIG. 1.

A more specified circuit structure of the memory circuit 1 is shown in FIG. 3, in which i indicates an integer of 0 to (n-1).

This memory circuit 1 includes four n-channel transistors T1 to T4 and a storage capacitance C1. The transistors T2, T3 and T4 are so set that the potential at an output terminal b is at the "L" level when all these transistors are turned on.

During data writing, a write address signal $WQ_i$ applied to a terminal c goes to an "H" level. The transistor T1 is thereby turned on so that the data Din applied to an input terminal a is written into the storage capacitance C1.

During data read-out, the read out address signal $RQ_i$ applied to the terminal d goes to the "H" level. The transistors T2 and T4 are turned on. When a data "1" is previously written in the storage capacitance C1, transistor T3 is turned on. As a result, an "L" level data Dout is supplied to the output terminal b. Conversely, when a data "0" is written into the storage capacitance C1, transistor T3 remains off so that the potential at the output terminal b is pulled up by the transistor T4 so that an "H" level data $D_{out}$ is supplied to the output terminal b.

Figure 4:
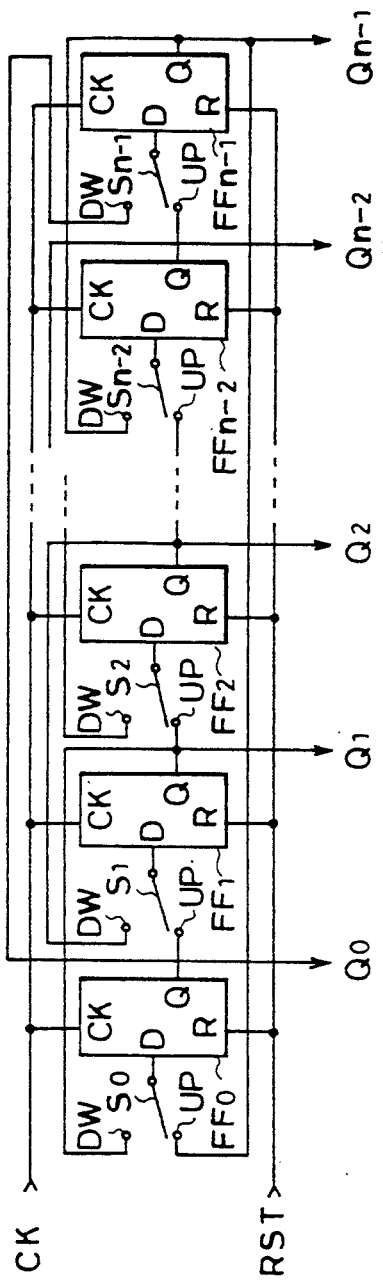
FIG. 4 is a block diagram showing the structure of an address pointer included in the LIFO device of FIG. 1.

FIG. 4 shows a specified structure of the address pointer. It is noted that the structure of the write address pointer 2 and the read-out address pointer 3 shown in FIG. 3 is similar to that shown in FIG. 4.

In FIG. 4, the clock signal CK corresponds to the write clock signal WCK or the read-out clock signal RCK, while a reset signal RRST corresponds to the write reset signal WRST or the read-out reset signal RRST. On the other hand, the address signals $Q_0$ to $Q_{n-1}$ corresponds to the address signals $WQ_0$ to $WQ_{n-1}$ or the read-out address signals $RQ_0$ to $RQ_{n-1}$.

This address pointer includes a number n of D flip-flops FF0 to FFn-1 and a number n of switching circuits S0 to Sn-1. The switching circuit S0 to Sn-1 are switched during the count-up operation to the side of a terminal UP during count-up operation and to the terminal DW during count-down operation. The switches S0 to Sn-1 are switched alternately each time they are reset by the reset signal RRST.

Figure 5:
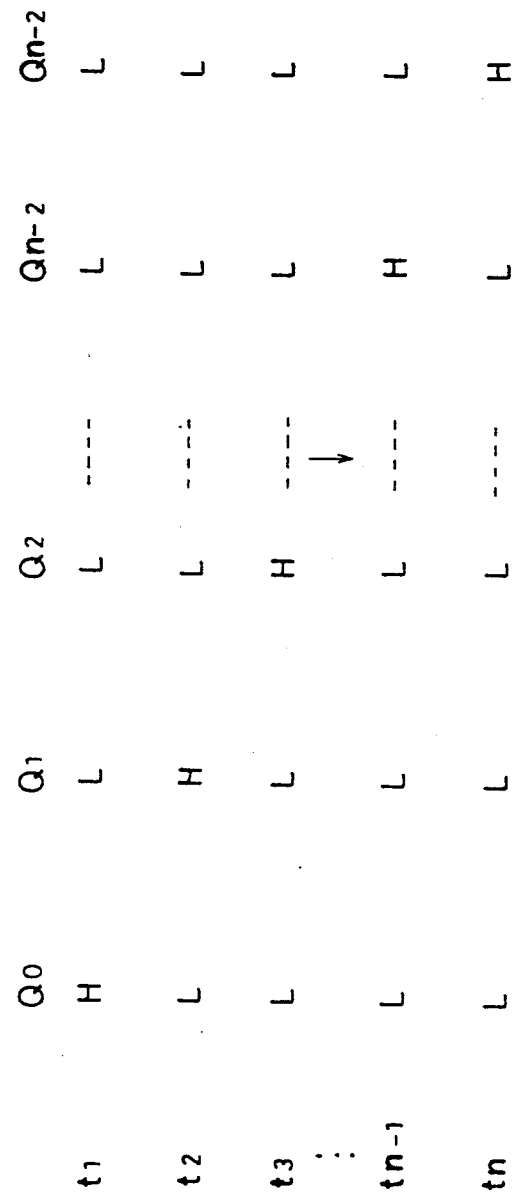
FIG. 5 illustrates the operation of the address pointer shown in FIG. 4.
Figure 7:
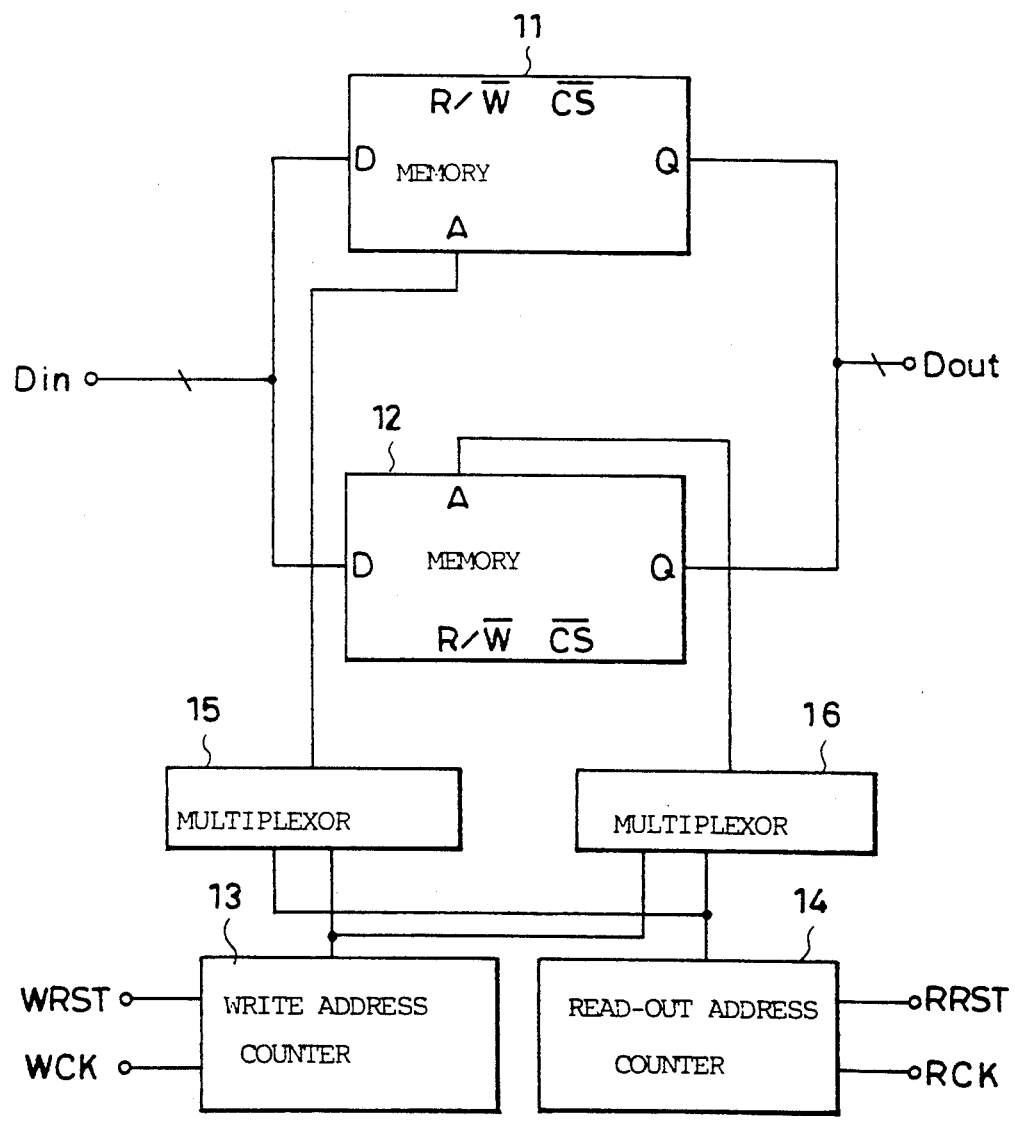
FIG. 7 is a block diagram showing the structure of a conventional LIFO device.
Figure 8:
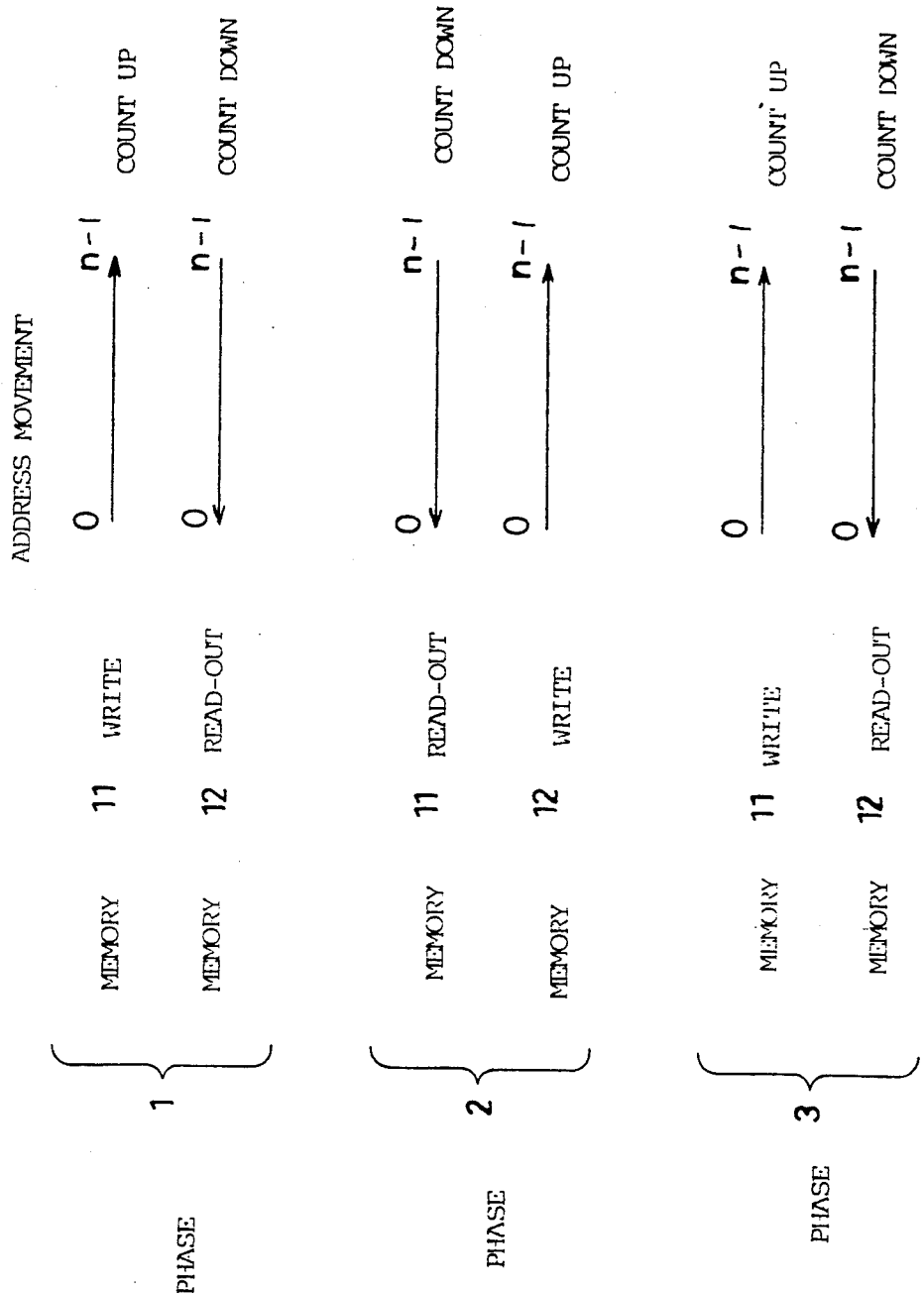
FIG. 8 shows address movement in the LIFO device of FIG. 7.

The operation of the address pointer of FIG. 4 is explained by referring to FIG. 5.

At time $t_1$, the address signal Q0 goes to the "H" level, the other address signals being at the "L" level.

At time $t_2$, the address signal Q1 goes to the "H" level, the other address signals being at the "L" level. In a similar manner, the address signals Q2 to Qn-2 sequentially go to the "H" level. Finally, at time $t_n$, the address signal $Q_{n-1}$ goes to the "H" level with the other address signals being at the "L" level. Conversely, for the count-down operation, the address signals $Q_{n-1}$ to $Q_0$ are raised in this order to the "H" level.

Referring to the timing charts of FIGS. 6A to 6C, the operation of the LIFO device of FIG. 1 is explained in detail. It is noted that FIGS. 6A to 6C illustrate the phases 1 to 3, respectively.

The time period corresponding to two cycles of the write clock signal WCK after falling of the write reset signal WRST represents a reset cycle. Similarly, the time period corresponding to two cycles of the read-out clock signal RCK after falling of the read-out reset signal RRST represents a reset cycle. In the phases 1 and 3, the reset cycle is sequentially followed by cycle 0 to cycle (n-1). In phase 2, the reset cycle is sequentially followed by cycle (n-1) to cycle 0. The cycle 0 to cycle (n-1) represent the cycles in which data are written into or read out from the address 0 to address (n-1), respectively.

First, if direction is drawn to the read-out clock signal RCK of phase 1, the read-out address signal $RQ_0$ is activated responsive to the second rising of the read-out clock signal RCK of the reset cycle. This causes data "n-1" stored in the address 0 to be read out. Then, responsive to the first rising of the read-out clock signal RCK in the cycle 0, the data "n-1" read out from the address 0 is latched by the read-out data latch circuit 5 so as to be outputted to outside. This activates the read-out address signal RQ1 to cause the data "n-2" stored in address 1 to be read out. Similarly, the read-out address signals $RQ_2$ to $RQ_{n-1}$ are sequentially activated to cause the data "n-3" to "0" stored in address 2 to address (n-1) to be outputted sequentially.

On the other hand, if direction is drawn to the write clock signal WCK, after the reset cycle and the cycle 0, the data "0" supplied from outside is latched in the write data latch circuit 4, in response to the first rising of the write clock signal WCK in the cycle 1, or the last rising of the write clock signal WCK in the cycle 0. At this time, the write address signal $WQ_0$ is activated to cause the data "0," latched in the write data latch circuit 4 to be written in the address 0. Similarly, the write address signals $WQ_1$ to $WQ_{n-1}$ are sequentially activated to cause the data "1" to "n-1," applied from outside to be written sequentially in the address 1 to address (n-1).

Then, if direction is drawn to the read-out clock signal RCK of phase 2, the read-out address signal $RQ_{n-1}$ is activated to read out data "n-1'" written in the address (n-1) in phase 1. Similarly, the read-out address signals $RQ_{n-2}$ to $RQ_0$ are sequentially activated to sequentially read out data "n-2'" to "0'" written in the address (n-2) to address 0 in phase 1. On the other hand, if direction is drawn to the write clock signal WCK in phase 2, the write address signal $WQ_{n-1}$ is first activated to write the data "0" applied from outside in the address (n-1). The write address signals $WQ_{n-2}$ to $WQ_0$ are sequentially activated to sequentially write data "1'''", to "n-1'''" applied from outside in the address (n-2) to address 0.

If direction is then drawn to the read-out clock signal RCK of phase 3, the read-out address signal $RQ_0$ is first activated to read out data "n-1" written in address 0 in phase 2. Similarly, the read-out address signals $RQ_1$ to $RQ_{n-1}$ are sequentially activated to sequentially read out data "n-2" to "0" written in address 1 to address (n-1) in phase 1.

On the other hand, if direction is drawn to the write clock signal WCK of phase 3, the write address signal $WQ_0$ is first activated to write the data "0'''" applied from outside in address 0. Similarly, the write address signals WQ$_1$ to WQ$_{n-1}$ are sequential activated to sequentially write data "1'''" to "n-1'''" applied from outside in address 1 to address (n-1).

In this manner, in the phases 1 to 3, addressing is performed so that the read-out address precedes the write address. In the phases 1 and 3, the addresses 0 to (n-1) are selected sequentially, whereas, in phase 2, the addresses (n-1) to address 0 are selected sequentially.

It will be noted that, although the specific address designated for the first time by resetting is set in the above embodiment so as to be address 0 or address (n-1), this specific address may be an address bearing any optional number.

In addition, although the designation of the specific address and switching between the count-up and count-down in the address pointer are made in the above illustrative embodiments by the write reset signal WRST or the read-out reset signal RRST, such designation and switching may also be made by other signals.

although the transistor T4 shown in FIG. 3 is controlled by the read-out address signal RQ$_i$ in the above embodiment, the transistor may be always in the on-state.

Although each address pointer comprises a plurality of D type flip-flops in the above embodiment, each addresses pointer may comprise any other circuits than the D type flip-flops, which have latch function and can perform sift operation. Data to be sifted may be "H" level data or "L" level data.

The structure of the memory circuit 1 is not limited to the structure shown in FIG. 3. For example, the transistor T4 may be shared by a plurality of memory circuits 1.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor memory device comprising
   a plurality of memory means (1) having predetermined addresses for respectively storing data,
   read pointer means (3) for sequentially pointing to addresses of said plurality of memory means (1) in a first sequence having a first direction and reading out data stored in the first sequence of the selected addresses,
   write pointer means (2) for sequentially pointing to addresses of said plurality of memory means (1) in the same first sequence having the same first direction and writing externally applied data to the first sequence of selected addresses,
   said read pointer means pointing to each address in said first sequence before said write pointer means points to each said address,
   each of said read pointer means and said write pointer means (2, 3) responsive to an external reset signal by alternating between said first sequence and a second sequence having a second direction opposite to said first direction, said external reset signal synchronously provided after said write pointer means points to a last address in said sequence.

2. A semiconductor memory device according to claim 1, wherein
   each of said read pointer means and said write pointer means includes
   a plurality of latch means (FF0 to FFn-1) connected in series with one another and each being responsive to a predetermined clock signal to latch inputted data and to output the same.

3. A semiconductor memory device according to claim 1, wherein each of said memory means comprises
   capacitance means (C1) for storing data,
   first switching means (T1) for writing data in said capacitance means (C1), and
   second switching means (T2) for reading out data from said capacitance means (C1).

4. A semiconductor memory device according to claim 3, wherein
   said first switching means includes a first transistor (T1), and
   said second switching means includes a second transistor (T2).

5. A semiconductor memory device according to claim 1, wherein
   each of said memory means includes
   an input terminal (a) for receiving data from outside,
   an output terminal (b) for outputting data,
   capacitance means (Cl) for storing data,
   a first transistor (T1) turned on during data writing,
   a second transistor (T2) turned on during data read-out,
   a third transistor (T3) turned on or off depending on data stored in said capacitance means (Cl), and
   a fourth transistor (T4) turned on during data read-out,
   said first transistor (T1) being connected between said input terminal (a) and said capacitance means (C1) and said second to fourth transistors (T2, T3 and T4) being connected between a predetermined source potential and a ground potential in series.

6. A semiconductor memory device according to claim 2, wherein
   each of said pointer means (2; 3) further includes a plurality of switching means S$_0$ to S$_{n-1}$ provided in correspondence to said latching means (FF0 to FFn-1),
   said latching means comprises n stages of latching means (FF0 to FFn-1)
   in case of selection in said first direction,
   respective outputs of the first stage latching means (FF0) to (n-1)th stage latching means (FFn-2) being coupled by corresponding switching means to the input of the next stage latching means, the output of the n th stage latching means(FFn-1) being coupled by corresponding switching means to the input of the first stage latching means (FF0), and
   in case of selection in said second direction, respective outputs of the first stage latching means (FF0) to the n'th stage latching means (FFn-1) being coupled by corresponding switching means to the inputs of the latching means of the preceding stages, with the output of the first stage latching means (FF0) being coupled by corresponding switching means to the n'th stage latching means (FFn-1).

7. A semiconductor memory device according to claim 2, wherein
   each of said latching means (FF0 to FFn-1) includes a D-flip flop.

8. A semiconductor memory device formed on one chip, comprising
   a plurality of memory means (1) for storing data, first selection means responsive to a first clock signal applied from outside for sequentially selecting from among said plurality of memory means (1) to write data applied from outside to the selected memory means, said first selection means including a write address pointer (2) responsive to said first clock signal for alternately repeating count-up and count-down operations, and second selection means (3) responsive to a second clock signal applied from outside for sequentially selecting from among said plurality of memory means 91) to read out data stored in the selected memory means (1), said second selection means including a read address pointer (3) responsive to said second clock signal applied from outside for alternately repeating said count-up and count-down operations, each of said write address pointer and read address pointer (2; 3) responsive to an externally applied reset signal by alternating between a first mode of selecting said memory means in one of said count-up and count-down operations and a second mode of selecting said memory means in the other of said count-up and count-down operations, said read pointer (3) selecting an address prior to selection of said address by said write pointer (2).

9. A method for controlling a semiconductor LIFO memory device comprising a plurality of memory means (1) having individual addresses, write pointer means (2) for selecting one of said memory means (1) in which data are to be written, and a read pointer means (3) for selecting one of said memory means from which data are to be read out, comprising the steps of:

controlling each of said write pointer means and said read pointer means (2; 3) to repeat a first mode of selecting addresses of said memory means (1) in a first predetermined sequence having a first direction and a second mode of selecting addresses of said memory means (1) in a second sequence which is the reverse of said predetermined sequence and having a direction opposite to said first direction, in each said mode;

said read pointer means and said write pointer means selecting said addresses in a same sequence having a same direction of counting up and counting down, and said read pointer means (3) selecting each address of the respective sequence prior to selection of said each address by said write pointer means (2), and providing an external reset signal to said write pointer means and said read pointer means upon termination of a selection sequence by said write pointer means for alternating between said first and second modes.

10. A semiconductor LIFO memory device comprising:

a plurality of individually addressable memory locations (1) operating in a succession of phases for storing data;

write pointer means (2) for selecting among said memory locations a sequence of memory locations in which data are to be written;

read pointer means (3) for selecting among said memory locations a sequence of memory locations from which data are to be read;

each of said write pointer means and said read pointer means including respective sequence establishing means for causing said write pointer means sand said read pointer means to select, in each phase of operation, a same sequence of said memory locations, said same sequence selected by both said write pointer means and said read pointer means alternating in said successive phases between first and second sequences in opposite directions, said respective sequence establishing means of said write pointer means and said read pointer means establish said same sequence responsive to timing signals, said read pointer means selecting, in each phase, an individual memory address for reading prior to said write pointer means selecting said address in said same phase for writing.

11. A semiconductor LIFO memory device as recited in claim 10 wherein said plurality of individually addressable memory locations comprise a plurality of individually addressable memory locations of a single memory structure.

12. A semiconductor LIFO memory device as recited in claim 10 wherein said sequence establishing means of said write pointer means receives a write clock signal input, said write clock signal having a succession of phases, each phase including a reset cycle followed by a plurality of write cycles, said sequence establishing means of said write pointer means responding to each phase of said write clock signal input thereby to addressing a first memory location of said same sequence in response to a predetermined write cycle following termination of said reset cycle of said each phase and by addressing successive ones of said memory locations of said same sequence in response to each write cycle in said each phase following said reset cycle, and said sequence establishing means of said read pointer means receives a read clock signal input, said read clock signal having a succession of phases, each phase including a reset cycle substantially coincident with said reset cycle of said write clock signal and followed by a plurality of read cycles, said sequence establishing means of said read pointer means including means for responding to each phase of said read clock signal input thereto by addressing said first memory location of said same sequence during said reset cycle of said each phase, prior to said write pointer means, and by addressing successive ones of said memory locations of said same sequence in response to each read cycle in said each phase following said reset cycle, thereby reading data from each memory location prior to writing new data therein.

13. A semiconductor LIFO memory device as recited in claim 12 wherein said sequence establishing means of said write pointer means further receives a write reset signal and said sequence establishing means of said read pointer means further receives a read rest signal, said sequence establishing means of said write and read pointer means responding to the write reset and read reset signals respectively inputted thereto by changing a direction of said same sequence of addressing said memory locations, said read and write pointer means selecting, in each phase, the same sequence of memory locations, said read pointer means selecting in each phase a memory location for reading prior to selection of that location by the write pointer means for writing.

14. A semiconductor LIFO memory device as recited in claim 11, further comprising a data internal for inputting data to be written in said addressable memory locations and a data out terminal for outputting data read from said addressable memory locations, a single write data latch having an input connected to said data in terminal and an output providing said inputted data to said addressable memory locations, said write pointer means having a plurality of terminals respectively connected to said addressable memory locations for enabling writing of said inputted data from said write data latch in respective ones of said individually addressable memory locations in said sequence;

a single read data latch having an output connected to said data out terminal and a plurality of inputs receiving data from said addressable memory locations;

said read pointer means having a plurality of terminals respectively connected to said addressable memory locations for enabling output of said data to said read data latch from respective ones of said individually addressable memory locations in said sequence.

15. A semiconductor LIFO memory device as recited in claim 14, wherein said write data latch and said read data latch are directly connected to said input and output terminals, respectively, and are directly connected to said addressable memory locations, said respective direct connections being free of multiplexing means.

* * * * *